(12) United States Patent
Krah

(10) Patent No.: US 9,294,008 B2
(45) Date of Patent: Mar. 22, 2016

(54) TWO-QUADRANT CHOPPER

(75) Inventor: Jens Onno Krah, Wuppertal (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 827 days.

(21) Appl. No.: 13/480,782

(22) Filed: May 25, 2012

(65) Prior Publication Data

US 2012/0299522 A1  Nov. 29, 2012

(30) Foreign Application Priority Data

May 26, 2011 (DE) .......................... 10 2011 076 512

(51) Int. Cl.
| | |
|---|---|
| H02P 3/00 | (2006.01) |
| G05F 1/00 | (2006.01) |
| H02M 1/12 | (2006.01) |
| H02M 7/538 | (2007.01) |
| H02M 3/337 | (2006.01) |

(52) U.S. Cl.
CPC ........ H02M 7/53803 (2013.01); H02M 3/3376 (2013.01)

(58) Field of Classification Search
CPC ...... H02M 1/12; H02M 7/53871; H02M 7/48
USPC .............................. 318/504; 323/271; 363/40
See application file for complete search history.

(56) References Cited

U.S. PATENT DOCUMENTS

| | | | |
|---|---|---|---|
| 4,651,267 A | | 3/1987 | Nguyen et al. |
| 5,138,249 A | * | 8/1992 | Capel ............................ 323/283 |
| 5,621,628 A | | 4/1997 | Miyazaki et al. |
| 5,998,960 A | * | 12/1999 | Yamada et al. ............... 320/104 |
| 6,307,760 B1 | * | 10/2001 | Ikimi ............................... 363/39 |
| 6,954,366 B2 | * | 10/2005 | Lai et al. .......................... 363/71 |
| 2003/0117815 A1 | * | 6/2003 | Saada .............................. 363/40 |
| 2004/0080966 A1 | | 4/2004 | Chadwick et al. |
| 2009/0160248 A1 | * | 6/2009 | Ang ............................... 307/9.1 |

FOREIGN PATENT DOCUMENTS

| | | |
|---|---|---|
| DE | 100 07 416 C1 | 6/2001 |
| DE | 10 2009 007476 A1 | 8/2010 |
| JP | 2001197757 | 7/2001 |

OTHER PUBLICATIONS

Chapter 14: "Resonance and Ringing" in D V Bugg: "Electronics: Circuits, Amplifiers and Gates", 2005, IOP Publishing Ltd., U.K., pp. 261-276.

Todd, Philip C. "Snubber Circuits: Theory, Design and Application" pp. 2-1 through 2-17 May 31, 1993. Retrieved from http://focus.ti.com/lit/an/slup100/slup100.pdf on Aug. 16, 2007.

Search Report issued by European Patent Office in connection with European Patent Application No. 12167130.9 on Sep. 25, 2012. 29 pages.

Office action issued in connection with German Patent Application No. 10 2011 076 512.3. German Patent Office. Feb. 9, 2012. 10 pages.

* cited by examiner

Primary Examiner — Bentsu Ro
Assistant Examiner — Gabriel Agared
(74) Attorney, Agent, or Firm — Dorsey & Whitney LLP

(57) ABSTRACT

A two-quadrant chopper including first, second, third and fourth nodes wherein an input voltage may be applied between the first and second nodes, a first output voltage may be picked off between the first and third nodes and a second output voltage may be picked off between the third and second nodes, wherein a first capacitor is between the first and third nodes and a second capacitor is between the third and second nodes, a first transistor and a first diode are connected to the first and fourth nodes, a second transistor and a second diode are connected to the fourth and second nodes, and an inductor is between the third and fourth nodes.

14 Claims, 3 Drawing Sheets

TWO-QUADRANT CHOPPER

CROSS-REFERENCE TO RELATED APPLICATIONS

This application claims priority to German Patent Application No. 10 2011 076 512.3, filed on May 26, 2011, the entire content of which is incorporated herein by reference.

BACKGROUND

It is known to use frequency converters comprising a voltage link for open-loop and closed-loop control of electric drives. Corresponding control circuits first generate a direct voltage from a mains voltage, which is in most cases a first three-phase voltage, via a B6 diode bridge or via a feed-in converter. The generated direct voltage may e.g. amount to 700 V. By means of the control circuit, the direct voltage is subsequently converted into a second three-phase voltage via a converter, the second three-phase voltage comprising an amplitude and a frequency which are adjustable to a certain extent. By varying the amplitude and frequency, torque and rotational speed of the electric motor provided with the second three-phase voltage may be set.

The converter for generating the second three-phase voltage usually comprises six power-electronic switches, typically IGBT switches. The power-electronic switches are e.g. accessed by means of pulse-width modulation according to the space-vector-modulation method in order to generate the second three-phase voltage comprising the desired amplitude and frequency.

The power-electronic IGBT switches do not operate in an ideal manner. If the switches are enabled, conduction losses accumulate. Moreover, switching losses accumulate during the switching of the switches.

If the power-electronic switches are accessed with a high switching frequency, short response times and a low current-ripple factor are the result, but also high switching losses. If the power-electronic switches are accessed with a low switching frequency, the switching losses decrease, thus increasing efficiency. However, a lower switching frequency is attended by declined response times and a higher current-ripple factor.

Another option would be to directly convert the first three-phase voltage provided as mains voltage into the second three-phase voltage for supplying the electric motor by means of a three-phase autotransformer having an adjustable amplitude. However, such three-phase autotransformers have a considerable size and comparatively low efficiency.

Instead of a converter comprising IGBT switches, a converter having MOSFET switching transistors could be used, as well. Thereby, small-range drives having a power of approximately 2 kW could be operated. Suitable MOSFET switching transistors are available with block voltages ranging up to 600 V. By means of these transistors, frequency converters with voltage links of up to approximately 400 $V_{dc}$ may be configured.

The efficiency of such MOSFET converters may be more than 99%. Due to the low losses, the MOSFET converter may be configured in a compact manner, thus allowing for integration of the MOSFET converter into the motor.

A motor-integrated MOSFET converter may be provided with power by means of a direct voltage of about 350 $V_{dc}$. This supply voltage of 350 $V_{dc}$ may e.g. be generated from the direct voltage yielded from the mains voltage by means of a step-down converter or, respectively, one-quadrant chopper. The power semiconductors and the inductively of the step-down converter must thereby be adjusted to the largest possible peak current. This again results in power losses of the step-down converter, reducing the overall efficiency of the entire drive system.

Instead of a step-down converter or a one-quadrant chopper, use might also be made of a two-quadrant chopper. It allows for feeding back the power stored in the drive maintaining a relatively high efficiency.

SUMMARY

Embodiments of the present invention provide an improved two-quadrant chopper, an improved method for operating a two-quadrant chopper, and an improved control circuit for an electric drive.

In an embodiment of the present invention, a two-quadrant chopper comprises a first node, a second node, a third node and a fourth node. An input voltage may be applied between the first node and the second node. A first output voltage may be picked off between the first node and the third node. A second output voltage may be picked off between the third node and the second node. A first capacitor is arranged between the first node and the third node. A second capacitor is arranged between the third node and the second node. A collector of a first transistor is connected to a first node and an emitter of the first transistor is connected to the fourth node. A cathode of a first diode is connected to the first node and an anode of the first diode is connected to the fourth node. A collector of a second transistor is connected to the fourth node and an emitter of the second transistor is connected to the second node. A cathode of a second diode is connected to the fourth node and an anode of the second diode is connected to the second node. An inductor is arranged between the third node and the fourth node.

An embodiment of the present invention is related to a method for operating a two-quadrant chopper. The two-quadrant chopper comprises a first node, a second node, a third node and a fourth node. An input voltage is applied between the first node and the second node. A first output voltage is picked off between the first node and the third node. A second output voltage is picked off between the third node and the second node. A first capacitor is arranged between the first node and the third node. A second capacitor is arranged between the third node and the second node. A collector of a first transistor is connected to a first node and an emitter of the first transistor is connected to the fourth node. A cathode of a first diode is connected to the first node and an anode of the first diode is connected to the fourth node. A collector of a second transistor is connected to the fourth node and an emitter of the second transistor is connected to the second node. A cathode of a second diode is connected to the fourth node and an anode of the second diode is connected to the second node. An inductor is arranged between the third node and the fourth node. According to the method, the first transistor is operated in a conducting state and the second transistor is operated in a non-conducting state in a first time interval having a first duration. In a second time interval having a second duration, the first transistor is operated in a non-conducting state and the second transistor is operated in a conducting state. In this context, the second time interval is again followed by a first time interval.

In an embodiment of the present invention, a control circuit for an electric drive comprises a two-quadrant chopper. The two-quadrant chopper comprises a first node, a second node, a third node and a fourth node. An input voltage may be applied between the first node and the second node. A first output voltage may be picked off between the first node and the third node. A second output voltage may be picked off between the third node and the second node. A first capacitor is arranged between the first node and the third node. A second capacitor is arranged between the third node and the second node. A collector of a first transistor is connected to a first node and an emitter of the first transistor is connected to the fourth node. A cathode of a first diode is connected to the first node and an anode of the first diode is connected to the fourth node. A collector of a second transistor is connected to the fourth node and an emitter of the second transistor is connected to the second node. A cathode of a second diode is connected to the fourth node and an anode of the second diode is connected to the second node. An inductor is arranged between the third node and the fourth node.

DETAILED DESCRIPTION OF DRAWINGS

Any reference to "the invention" in this entire document shall not be construed as a generalization, limitation or characterization of any subject matter disclosed and shall not be considered to be an element or limitation of the appended claims except if and/or where explicitly recited in a claim(s). With regard to fastening, mounting, attaching or connecting components, unless specifically described as otherwise, conventional fasteners and methods may be used, e.g. mechanical fasteners, adhesives, welding and soldering. Suitable electrical components, e.g. circuitry, wires, wireless components, chips, boards, microprocessors, inputs, outputs, displays, control components, etc. may be used. Generally, unless otherwise indicated, the materials for making embodiments and/or components thereof may be selected from appropriate materials such as metal, metallic alloys, ceramics, plastics, etc. Unless otherwise indicated specifically or by context, positional terms (e.g., up, down, front, rear, distal, proximal, etc.) are descriptive not limiting. Same reference numbers are used to denote same parts or components.

Figure 1:
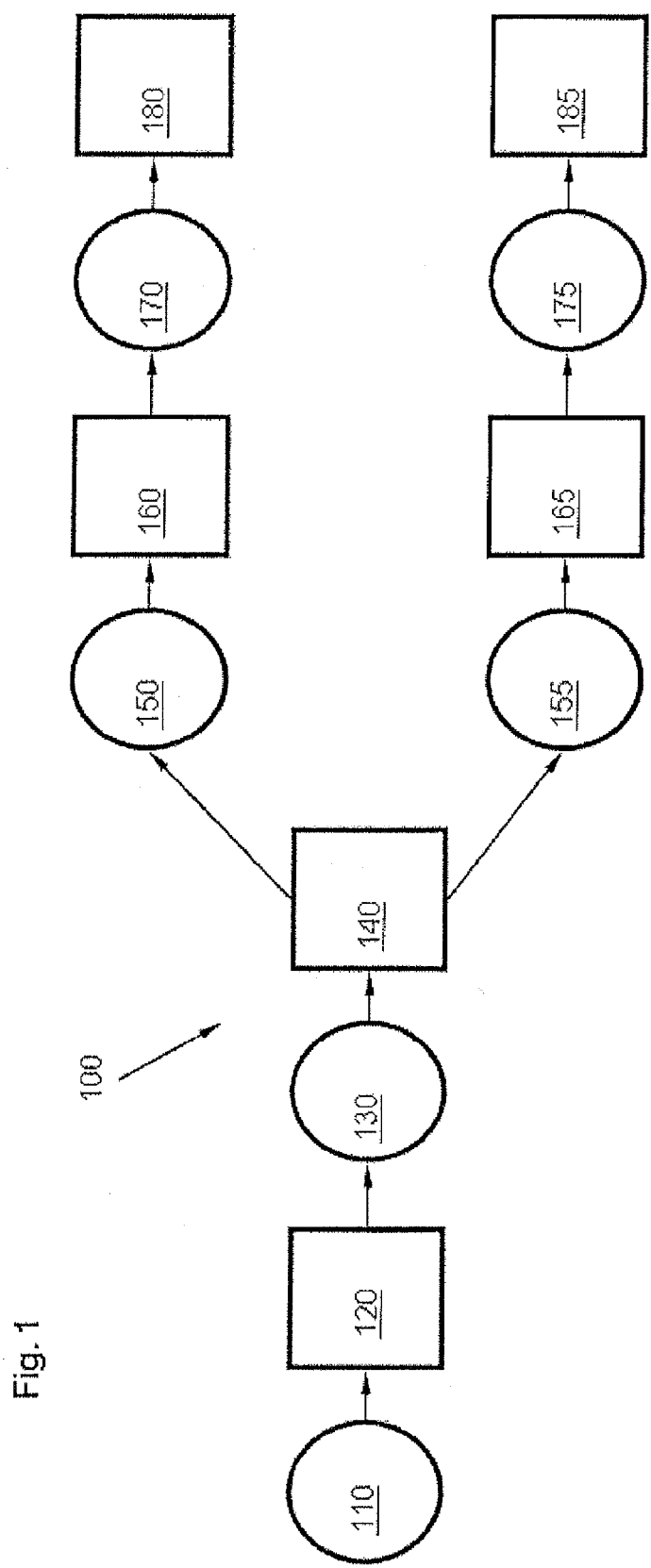
FIG. 1 shows a schematic block diagram of a control circuit.

FIG. 1 depicts a schematic block diagram of a control circuit 100 for addressing an electrical drive. The control circuit 100 may e.g. serve to address an electric drive of a motor vehicle. However, the control circuit 100 may also be utilized in the field of automation technology or in other technical fields in which speed-controlled drives are used.

The control circuit 100 serves to supply a first motor 180 and a second motor 185 with a mains voltage 110. Instead of the first motor 180, a whole group of first drives might be provided, as well. Instead of the second motor 185, a whole group of second drives might be provided, as well.

The first motor 180 is supplied with energy by a first three-phase voltage 170. The second motor 185 is supplied with energy by a second three-phase voltage 175. Motor speed and torque of the motors 180, 185 may be predefined to a limited extent by frequencies and amplitudes of the first three-phase voltage 170 and the second three-phase voltage 175.

The mains voltage 110 is usually a three-phase voltage, as well. The mains voltage 110, however, has a defined frequency and a defined amplitude. In order to set the motor speed and torque of the motors 180, 185, the mains voltage 110 having a set frequency and amplitude has thus to be modified into the first three-phase voltage 170 and the second three-phase voltage 175 by means of adjustable frequencies and amplitudes. In the control circuit 100, a below-described frequency converter comprising a voltage link serves this purpose.

The control circuit 100 comprises a rectifier 120 which generates a first direct voltage 130 from the mains voltage 110. Such rectifiers are well known in the prior art. The rectifier 120 may e.g. be a B6 diode bridge or a feed-in converter. The first direct voltage 130 generated by the rectifier 120 may e.g. have a voltage value of 700 $V_{dc}$.

The first direct voltage 130 is fed to a two-quadrant chopper 140 in the control circuit 100, the two-quadrant chopper 140 generating a second direct voltage 150 and a third direct voltage 155 from the first direct voltage 130. The second direct voltage 150 and the third direct voltage 155 have a lower voltage than the first direct voltage 130. If the first direct voltage 130 is 700 $V_{dc}$, the second direct voltage 150 and the third direct voltage 155 may e.g. each amount to 350 $V_{dc}$.

The second direct voltage 150 is converted into the first three-phase voltage 170 by a first converter 160 of the control circuit 100. The first converter 160 thereby allows for defining amplitude and frequency of the first three-phase voltage 170, to a certain extent, as desired. The third direct voltage 155 is converted into the second three-phase voltage 175 by a second converter 165 of the control circuit 100. In this context, the second converter 165 also allows for setting frequency and amplitude of the second three-phase voltage 175 to a certain extent. By setting the amplitudes and frequencies of the three-phase voltages 170, 175, motor speeds and torques of the motors 180, 185 supplied by the three-phase voltages 170, 175 may be adjusted.

The rectifier 120 may also be configured as a three-level converter. In this case, it may e.g. be used for realizing a mains feedback in order to feed back energy from the motors 180, 185 to the mains power supply via the converter 160, 165, the two-quadrant chopper 140 and the three-level converter 120. The rectifier 120 configured as three-level converter may actively balance the voltages 150 and 155, which would result in a parallelly effective improvement of the efficiency of the control circuit 100.

A further three-level converter may be connected to the two voltages 120 and 155, the further three-level converter e.g. supplying a spindle drive with a high frequency or addressing a highly dynamic servo drive.

Figure 2:
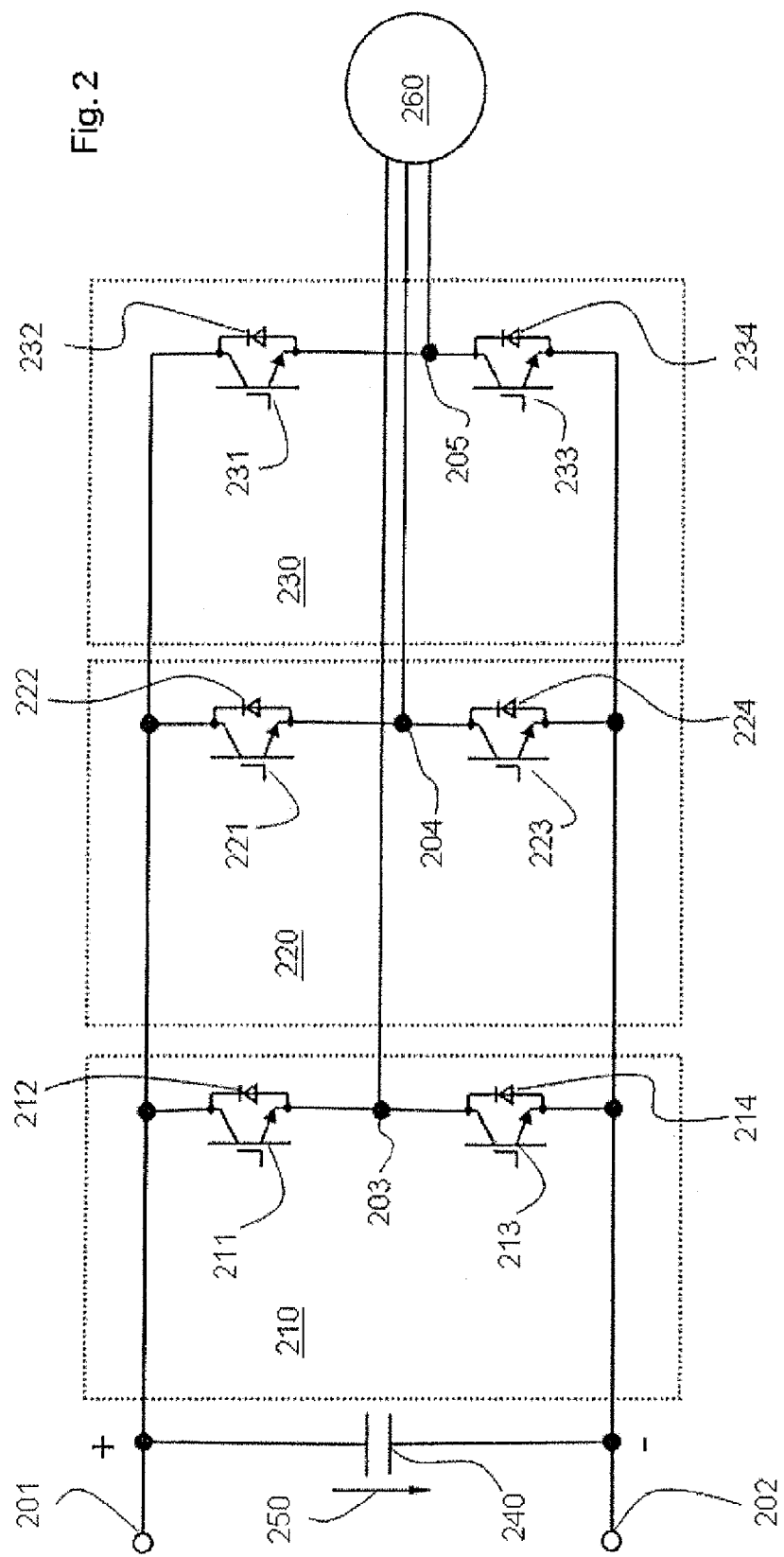
FIG. 2 shows a circuit arrangement of a converter.

The first converter 160 and the second converter 165 may be configured as two-level converters according to FIG. 2.

FIG. 2 shows a circuit arrangement of an exemplary two-level converter 200.

The converter 200 comprises a first circuit node 201, a second circuit node 202, a third circuit node 203, a fourth circuit node 204 and a fifth circuit node 205.

The converter 200 further comprises a first half bridge 210, a second half bridge 220 and a third half bridge 230. The first half bridge 210 comprises a first transistor 211, a first diode 212, a second transistor 213 and a second diode 214. A collector of the first transistor 211 is connected to the first node 201. An emitter of the first transistor 211 is connected to the third node 203. A cathode of the first diode 212 is connected to the first node 201. An anode of the first diode 212 is connected to the third node 203. A collector of the second transistor 213 is connected to the third node 203. An emitter of the second transistor 213 is connected to the second node 202. A cathode of the second diode 214 is connected to the third node 203. An anode of the second diode 214 is connected to the second node 202.

The second half bridge 220 comprises a third transistor 221, a third diode 222, a fourth transistor 223 and a fourth diode 224. A collector of the third transistor 221 is connected to the first node 201. An emitter of the third transistor 221 is connected to the fourth node 204. A cathode of the third diode 222 is connected to the first node 201. An anode of the third diode 222 is connected to the fourth node 204. A collector of the fourth transistor 223 is connected to the fourth node 204. An emitter of the fourth transistor 223 is connected to the second node 202. A collector of the fourth diode 224 is connected to the fourth node 204. An anode of the fourth diode 224 is connected to the fourth node 202.

The third half bridge 230 comprises a fifth transistor 231, a fifth diode 232, a sixth transistor 233 and a sixth diode 234. A collector of the fifth transistor 231 is connected to the first node 201. An emitter of the fifth transistor 231 is connected to the fifth node 205. A cathode of the fifth diode 232 is connected to the first node 201. An anode of the fifth diode 232 is connected to the fifth node 205. A collector of the sixth transistor 233 is connected to the fifth node 205. An emitter of the sixth transistor 233 is connected to the second node 202. A cathode of the sixth diode 234 is connected to the fifth node 205. An anode of the sixth diode 234 is connected to the second node 202.

The converter 200 further comprises a capacitor 240 which is arranged between the first node 201 and the second node 202.

An input voltage 250 may be applied in parallel to the capacitor 240 between the first node 201 and the second node 202. The input voltage 250 is a direct voltage, the positive terminal of which is applied to the first node 201 and the negative terminal of which is applied to the second node 202. In the first converter 160 of the control circuit 100 of FIG. 1, e.g. the second direct voltage 150 serves as an input voltage 250. In the second converter 165 of the control circuit 100, the third direct voltage 155 serves as input voltage 250.

At the third node 203 of the converter 200, a first phase of a three-phase output voltage 260 may be picked off. At the fourth node 204 of the converter 200, a second phase of the three-phase output voltage 260 may be picked off. At the fifth node 205 of the converter 200, a third phase of the three-phase output voltage 260 may be picked off. The three-phase output voltage 260 is a three-phase rotary voltage.

During operation of the converter 200, the transistors 211, 213, 221, 223, 231, 233 of the converter 200 are addressed by means of a pulse width modulation according to the principles of sinusoidal modulation or space vector modulation known from the prior art in order to generate the output voltage 260 with a definable amplitude and frequency from the input voltage 250. In the prior art, the transistors 211, 213, 221, 223, 231, 233 are formed as bipolar transistors comprising an insulated gate electrode (IGBT transistors). However, in this context, the transistors 211, 213, 221, 223, 231, 233 do not operate in an ideal manner. Conduction losses occur when the transistors 211, 213, 221, 223, 231, 233 are switched on. Additionally, switching losses occur when the transistors 211, 213, 221, 223, 231, 233 are switched on and off. If the transistors 211, 213, 221, 223, 231, 233 are switched with a high switching frequency, the results are short response times of the converter 200 and a low current ripple factor of a current driven by the output voltage 260 of the converter 200. If the transistors 211, 213, 221, 223, 231, 233 are switched with a low switching frequency, the switching losses are in turn reduced and the efficiency of the converter 200 improves.

If a drive with a low power up to approximately 2 kW is driven by the output voltage 260 generated by the converter 200, i.e. if in the exemplary control circuit 100 of FIG. 1 the motors 180, 185 only have a power input of up to approximately 2 kW, MOSFET transistors may be used for the transistors 211, 213, 221, 223, 231, 233 instead of bipolar transistors with insulated gate electrodes (IGBT transistors). Since, however, suitable MOSFETs with a fast body diode are only available with a block voltage of approximately 600 V, the input voltage 250 of the converter 200 configured with MOSFETs must not exceed a value of approximately 400 $V_{dc}$. Advantageously, the use of converters 200 configured in such a way in the control circuit 100 of FIG. 1 is possible since the first direct voltage 130 generated by the rectifier 120 and having a high voltage value is divided up by the two-quadrant chopper 140 into the second direct voltage 150 and the third direct voltage 155, the voltage values of which are sufficiently small in order to configure the converters 160, 165 with MOSFET transistors.

The efficiency of the converter 200 configured with MOSFET transistors may be more than 99%. Due to the low losses, an integration of the converter 200 in a motor is a valuable option. Due to the use of MOSFETs for the first transistor 211, the second transistor 213, the third transistor 221, the fourth transistor 223, the fifth transistor 231 and the sixth transistor 233, only a fraction of the voltage value of 1 to 2 V per transistor for IGBTs occurs ($R_{DSON}$*I). Since the switching losses are lower for MOSFETs, as well, the losses of the converter 200 are reduced to less than half when compared to a converter comprising IGBTs.

Figure 3:
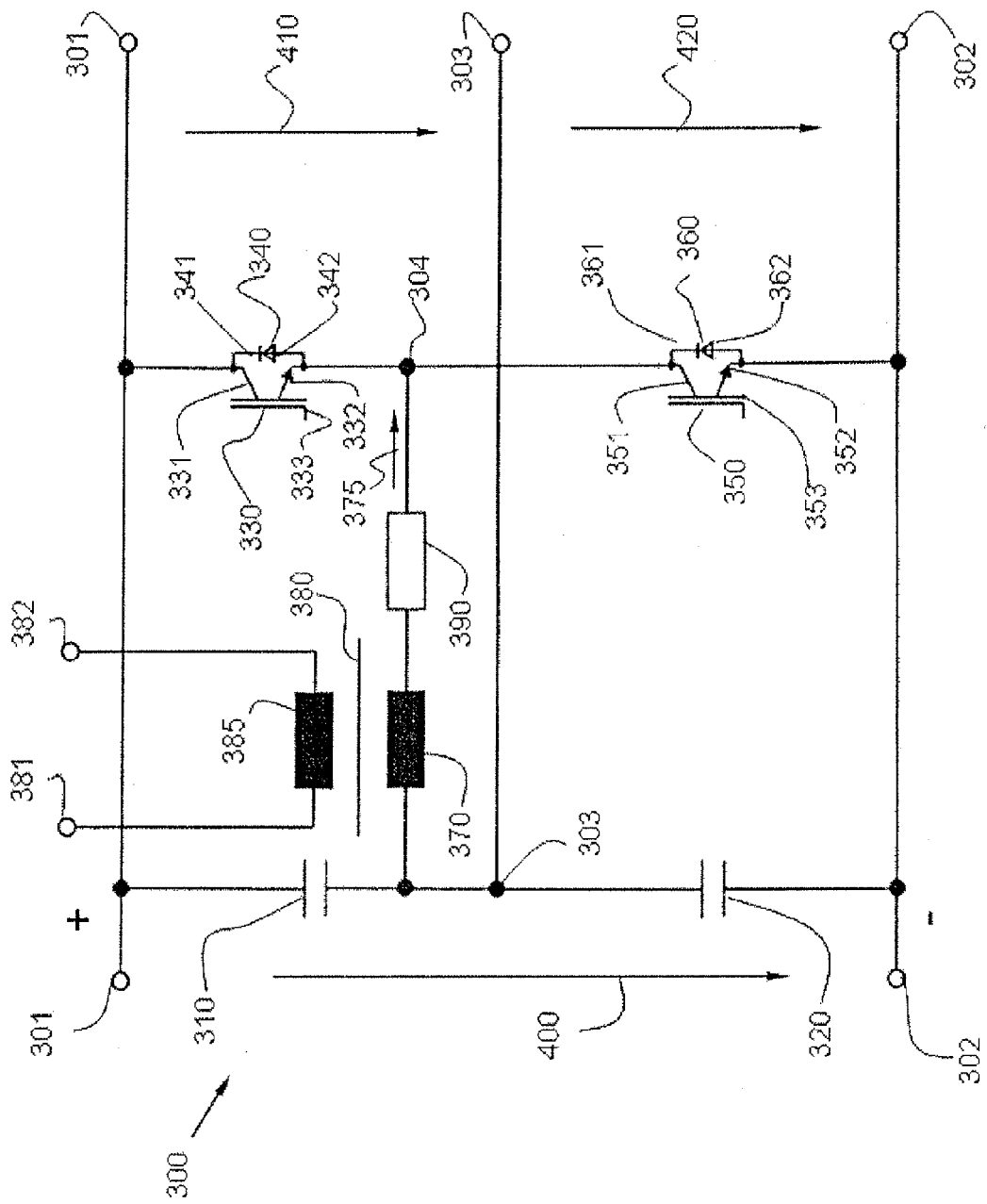
FIG. 3 shows a circuit arrangement of a two-quadrant chopper.

FIG. 3 depicts a circuit arrangement of a two-quadrant chopper 300. The two-quadrant chopper 300 of FIG. 3 may be used as the two-quadrant chopper 140 in the control circuit 100 of FIG. 1.

The two-quadrant chopper 300 comprises a first voltage node 301, a second voltage node 302, a third voltage node 303 and a fourth voltage node 304.

An input voltage 400 may be applied between the first node 301 and the second node 302 of the two-quadrant chopper 300. The input voltage 400 is a direct voltage with a high voltage value of e.g. 700 $V_{dc}$. In the control circuit 100 of FIG. 1, the two-quadrant chopper 140 is fed e.g. the first direct voltage 130 as an input voltage 400.

A first output voltage 410 may be picked off between the first node 301 and the third node 303 of the two-quadrant chopper 300. The first output voltage 410 is a direct voltage, the voltage value of which is lower than the voltage value of the input voltage 400. If the input voltage 400 is e.g. 700 $V_{dc}$, the first output voltage 410 may e.g. be 350 $V_{dc}$. A second output voltage 420 may be picked off between the third node 303 and the second node 302 of the two-quadrant chopper 300. The second output voltage 420 is a direct voltage, as well, the voltage value of which is lower than the voltage value of the input voltage 400. If the input voltage 400 is 700 $V_{dc}$, the second output voltage 420 may e.g. amount to 350 $V_{dc}$, as well. In the control circuit 100 of FIG. 1, the second direct voltage 150 is output as the first output voltage 410 and the third direct voltage 155 is output as second output voltage 420.

The two-quadrant chopper 300 of FIG. 3 comprises a first capacitor 310 which is arranged between the first node 301 and the third node 303. Moreover, the two-quadrant chopper 300 comprises a second capacitor 320 which is arranged between the third node 303 and the second node 302. When combined, the first capacitor 310 and the second capacitor 320 form a link voltage capacitor of the two-quadrant chopper 300.

The two-quadrant chopper 300 further comprises a first transistor 330 and a first diode 340. A collector 331 of the first transistor 330 is connected to the first node 301. An emitter 332 of the first transistor 330 is connected to the fourth node 304. The first transistor 330 further comprises a gate 333, by means of which the first transistor 330 may be switched between a conducting an a non-conducting state. A cathode 341 of the first diode 340 is connected to the first node 301. An anode 342 of the first diode 340 is connected to the fourth node 304. The first diode 340 is thus connected in parallel as a free-wheeling diode of the collector-emitter path of the first emitter 330.

The two-quadrant chopper 300 further comprises a second transistor 350 and a second diode 360. A collector 351 of the second transistor 350 is connected to the fourth node 304. An emitter 352 of the second transistor 350 is connected to the second node 302. Moreover, the second transistor 350 comprises a gate 353 by which the second transistor 350 may be switched between a non-conducting and a conducting state. A cathode 361 of the second diode 360 is connected to the fourth node 304. An anode 362 of the second diode 360 is connected to the second node 302. The second diode 360 is thus connected in parallel as a free-wheeling diode of the collector-emitter-path of the second transistor 350.

In some preferred embodiments, the first transistor 330 and the second transistor 350 are bipolar transistors comprising an insulated gate electrode (IGBTs).

Moreover, the two-quadrant chopper 300 comprises an inductor 370 which is arranged between the third node 303 and the fourth node 304 of the two-quadrant chopper 300.

The two-quadrant chopper 300 of FIG. 3 may also be conceived as a combination between a step-down converter or, respectively, a buck converter and a step-up converter or, respectively, a boost converter. Thus, the two-quadrant chopper 300 is suitable for feeding loads from the input voltage 400 via the output voltages 410, 420, as well as for feeding back energy from the loads operated in the generator mode. In contrast to a conventional two-quadrant chopper, however, in the two-quadrant chopper 300 of FIG. 3 the link voltage capacitors 310, 320 are simultaneously used as output capacitors, thus cutting down on components.

Advantageously, the two-quadrant chopper 300 of FIG. 3 may simultaneously power two drives or two groups of drives having, in sum, a similar peak power. The first group of drives is in this context supplied by the first output voltage 410. The second group of drives is supplied by the second output voltage 420. In the control circuit 100 of FIG. 1, the first motor 180 represents the first group of drives. The second motor 185 represents the second group of drives.

The two-quadrant chopper 300 merely has to compensate a difference in power between the two groups of drives. As a result, the power rating of the two-quadrant chopper 300 may be cut in half with regard to a conventional two-quadrant chopper. Hereby, the efficiency of the two-quadrant chopper 300 is considerably improved in comparison to a conventional two-quadrant chopper. In a worst-case scenario, the losses in the two-quadrant chopper 300 are only half as high as in the case of a conventional two-quadrant chopper. At best, in the case of symmetrically configured groups of drives, an inductor current 375 flowing in an inductor 370 is very small and virtually no power losses occur.

During operation of the two-quadrant chopper 300, the first transistor 330 and the second transistor 350 are alternately switched between a conducting and a non-conducting state by means of the gate contacts 333, 353. At any point in time, one of the transistors 330, 350 is conducting, the other transistor 330, 350 non-conducting. The ratio of the duty cycle of the first transistor 330 to the period length, i.e. to the sum of duty cycles of the first transistor 330 and the second transistor 350, is referred to as modulation index a. If the modulation index a=0.5, both transistors 330, 350 are e.g. alternately switched on for the same respective duration of time.

Advantageously, it is not necessary in the case of the two-quadrant chopper 300 to control the output voltages 410, 420. Instead, the two-quadrant chopper may in the first order be operated by means of a consistent modulation index of a=0.5, i.e. with a duty factor of 50%. The input voltage 400 is then automatically divided up into two equal output voltages 410, 420.

However, in this operation mode, two only slightly dampened LC oscillating circuits are formed in the two-quadrant chopper 300. The first oscillating circuit is formed by the first capacitor 310 and the inductor 370. The second oscillating circuit is formed by the second capacitor 320 and the inductor 370. Each of the oscillating circuits has a resonant frequency $f_{res}$, whereby $$f_{res} = \frac{1}{2\pi\sqrt{LC}},$$

L being the inductively of the inductor 370 and C the capacity of the respective capacitor 310, 320. The inductor 370 may each e.g. have an inductivity of L=1 mH. The first capacitor 310 and the second capacitor 320 may e.g. each have a capacity of 500 μF. This results in a resonant frequency $f_{res}$ of 225 Hz.

The damping ratio D of the LC oscillating circuits is calculated as $$D = \frac{R}{2}\sqrt{\frac{C}{L}}.$$

Presuming that the inductor 370 and the conductors have an electrical resistance R=0.1Ω (Ohm), the resulting damping ratio D=0.035. The LC oscillating circuits formed in the two-quadrant chopper 300 are thus only very slightly dampened. This might under certain conditions result in a poor control behaviour of the two-quadrant chopper 300.

In order to increase the dampening of the oscillating circuits of the two-quadrant chopper 300, it would be possible to insert an electrical resistance of approximately 1Ω (Ohm) connected in series with the inductor 370 between the third node 303 and the fourth node 304. However, a power dissipation would occur at such a resistance, by means of which the efficiency of the two-quadrant chopper 300 would deteriorate.

Instead of a real resistance, however, a virtual resistance 390 connected in series with the inductor 370 may advantageously be inserted into the two-quadrant chopper 300 between the third node 303 and the fourth node 304. For this purpose, the modulation index a has to be influenced in a current-dependent manner in such a way that the resulting voltage change exhibits the same behaviour as a current-dependent voltage drop at the virtual resistance 390.

For this purpose, the two-quadrant chopper 300 comprises a device for measuring the strength of current of the inductor current 375 flowing in the inductor 370, said device not being depicted in FIG. 13. This device may e.g. consist in a shunt resistance. The modulation index a is then adapted in such a way that it is equal to the sum of the value 0.5 and the ratio of the product of the strength of current 375 (I) flowing in the inductor 370 and the virtual resistance 390 (R) to the amount of the input voltage 400 (U):

$$a = 0.5 + \frac{I \cdot R}{U}.$$

To serve the purpose, the value of the virtual resistance 390 may again be set to 1Ω (Ohm). The modulation index a thus calculated indicates the ratio of the duration during which the first transistor 330 is switched to a conducting state to the sum of the time durations during which the first transistor 330 and the second transistor 350 are switched to a conducting state.

The two-quadrant chopper 300 has a considerably lower power dissipation than conventional two-quadrant choppers. If e.g. two drives, each having a power of 1 kW, are supplied by a direct voltage of 350 V which is generated from a direct voltage of 700 V, a conventional two-quadrant chopper would have to be configured for a current of 2000 W/350 V=5.7 A. In case of an efficiency of 96% of the conventional two-quadrant chopper, the power dissipation would amount to 80 W in the full-load range.

If, however, both drives are connected in series with the two-quadrant chopper 300 of FIG. 3, i.e. if the first drive is fed by the first output voltage 410 and the second drive is fed by the second output voltage 420, all the two-quadrant chopper 300 has to do is to provide a differential current. If both drives each require the full load of 1 kW, the current in the two-quadrant chopper 300 equals zero. In the worst case, in which one of the drives requires 1 kW and the other drive does not input any power, 1000 W/350 V=2.85 A flow in the two-quadrant chopper 300. In a normal case, in which the first drive e.g. inputs 800 W and the second drive inputs 600 W, the two-quadrant chopper 300 only has to provide the compensating 200 W, which corresponds to a current of 0.6 A. In this mode of operation, the power dissipation of the two-quadrant chopper 300 is reduced to only 8 W (4%*(800 W−600 W)) in comparison to 56 W in a conventional two-quadrant chopper (4%*(800 W+600 W)).

By controlling the two-quadrant chopper 300 by means of the virtual resistance 390, it is possible without difficulty to connect a plurality of current supplies in parallel in order to increase power.

The voltage link of the two-quadrant chopper 300 could also be enlarged by additional capacities which are arranged in parallel to the first capacitor 310 and/or the second capacitor 320. In this case, the dampening of the two-quadrant chopper 300 would increase, thus rendering the two-quadrant chopper 300 even more stable for systemic reasons.

The two-quadrant chopper 300 may comprise an auxiliary winding 385 which forms a transformer 380 together with the inductor 370. The auxiliary winding 385 is arranged between a fifth node 381 and a sixth node 382 of the two-quadrant chopper 300.

Advantageously, a galvanically isolated voltage may be generated by the auxiliary winding 385. For this purpose, energy is extracted from the capacitor 310, 320 to which the higher voltage is applied. This procedure results in an implied balancing which further improves the efficiency of the two-quadrant chopper 300. Between the fifth node 381 and the sixth node 382, e.g. a rectifier may be arranged by means of which a further capacitor of the two-quadrant chopper 300 is charged. The rectifier and the further capacitor are not depicted in FIG. 3. The voltage building up at the further capacitor may e.g. be used in order to supply a motor brake with 24 $V_{dc}$. Said auxiliary voltage is recovered with a very high efficiency.

The auxiliary winding 385 may also be used for uninterrupted current supply. It is a usual procedure to use the energy stored in the rotating quantities of drives for supplying critical components in the case of a mains failure. In this case, the drives are operated in the generator mode and the energy from the drives is fed back by means of the two-quadrant chopper 300. By means of this, the transformer 380 formed by the inductor 370 and the auxiliary winding 385 may continue to dissipate power to the fifth node 381 and to the sixth node 382 and thus serve to provide power in an uninterrupted manner in the case of a mains failure, i.e. a drop of the input voltage 400. This is carried out with a high efficiency and only requires very little additional circuitry.

Thus, the present invention provides an improved two-quadrant chopper 300 by which two drives or two groups of drives may be operated in series with a high efficiency. The two-quadrant chopper 300 may be used in a control circuit 100. This offers the advantage that converters provided in the control circuit may be configured by MOSFET transistors, which improves their efficiency. A further advantage of the two-quadrant chopper is the possibility of recovering an additional supply voltage by an optional auxiliary winding from the voltage link, involving little time and effort and high efficiency.

In some embodiments in accordance with the present invention, a two-quadrant chopper may comprise a first node, a second node, a third node and a fourth node. An input voltage may be applied between the first node and the second node. A first output voltage may be picked off between the first node and the third node. A second output voltage may be picked off between the third node and the second node. A first capacitor is between the first node and the third node and a second capacitor is between the third node and the second node. A collector of a first transistor is connected to a first node and an emitter of the first transistor is connected to the fourth node. A cathode of a first diode is connected to the first node and an anode of the first diode is connected to the fourth node. A collector of a second transistor is connected to the fourth node and an emitter of the second transistor is connected to the second node. A cathode of a second diode is connected to the fourth node and an anode of the second diode is connected to the second node. An inductor is between the third node and the fourth node.

In said two-quadrant chopper, the link voltage capacitors are advantageously utilized as output capacitors at the same time; thus, a two-quadrant chopper according to the present invention comprises less components than a conventional two-quadrant chopper. By means of the two-quadrant chopper, two drives or, respectively, two groups of drives having a similar overall peak power may advantageously be operated in series. The two-quadrant chopper then advantageously renders the voltages applied to the groups of drives symmetrical, so that the two-quadrant chopper only has to provide the differential current between the currents flowing in the groups of drives and merely has to compensate the power difference of the two groups of drives. As a result, the power rating of the two-quadrant chopper according to the invention may advantageously be reduced, e.g. cut in half, in comparison to a conventional two-quadrant chopper. Advantageously, the efficiency of a two-quadrant chopper according to the present invention is thereby considerably improved.

In some preferred embodiments, the first transistor and/or the second transistor are bipolar transistors having an insulated gate electrode (IGBT). Advantageously, such transistors are suitable for switching sufficiently large voltages and power.

The two-quadrant chopper may comprise an auxiliary winding which, together with the inductor, forms a transformer. Advantageously, by this transformer, power may be uncoupled from the voltage link with very good efficiency and only little additional complexity. In this context, power is advantageously extracted from the capacitor of the two capacitors of the two-quadrant chopper which comprises the higher voltage. By this implicit balancing, the efficiency of the two-quadrant chopper is advantageously increased further.

The two-quadrant chopper may additionally comprise a rectifier and a further capacitor, the further capacitor being connected to the auxiliary winding by means of the rectifier. The further capacitor may then advantageously be charged via the rectifier by means of the transformer formed by the auxiliary winding. The voltage building up at the further capacitor may then advantageously be used for supplying additional units, e.g. for supplying a motor brake with 24 $V_{dc}$. An advantage arises from the fact that in case of a power failure energy stored in rotating quantities of a drive system may be used for supplying the other components with current in an uninterrupted manner. The two-quadrant chopper serves to feed back the energy stored in the rotating quantities and the auxiliary winding serves to use it for supplying the other components in an uninterrupted manner.

An electrical resistance may be arranged in series to the inductor between the third node and the fourth node of the two-quadrant chopper. Advantageously, the electrical resistance then increases a damping factor of oscillating circuits formed in the two-quadrant chopper, thus improving the controlling properties of the two-quadrant chopper.

The two-quadrant chopper may comprise a device for measuring an electric current flowing in the inductor. Advantageously, a virtual resistance may be inserted instead of a real electric resistance in order to increase the damping of the oscillating circuits formed in the two-quadrant chopper. Thus, losses occurring at a real electrical resistance are advantageously prevented. The device for measuring current may comprise a shunt resistance. Such a shunt resistance advantageously allows for reliable measuring of the electric current in the inductor with low losses.

The two-quadrant chopper may comprise a unit configured to vary a modulation index subject to the size of the current flowing in the inductor. Varying the modulation index may advantageously effect a change in voltage which behaves in the same way as a current-dependent voltage drop at a real resistance. Thus, a virtual resistance is inserted by varying the modulation index, the virtual resistance advantageously causing a damping of the oscillating circuits formed in the two-quadrant chopper without being attended by the power losses occurring at a real electric resistance.

The inductor may have an inductivity of 1 mH. Advantageously, this value has proven to be suitable for addressing drive components having a power in the range of several kW.

The first capacitor and the second capacitor may each have a capacity of 500 µF. Advantageously, these capacities have proven to be suitable for addressing drive systems having a power in the range of several kW.

In a method for operating a two-quadrant chopper configured in the above-described manner, the first transistor is operated in a conducting state and the second transistor is operated in a non-conducting state in a first time interval having a first duration. Moreover, in a second time interval having a second duration, the first transistor is operated in a non-conducting state and the second transistor is operated in a conducting state. In this context, the second time interval is again followed by a first time interval. Advantageously, the full operating voltage is used in this method, resulting in that in principle only switching losses occur. By means of this, good efficiencies may advantageously be achieved. Advantageously, a ripple of the generated output voltages may be influenced by the durations of the time intervals.

The first duration may equal the second duration. Advantageously, it is not necessary in this method to control the output voltages generated by means of the two-quadrant chopper. The two-quadrant chopper operated with a consistent modulation index of 0.5 automatically divides up the voltages in two equal output voltages.

The two-quadrant chopper may comprise a device for measuring an electric current flowing in the inductor. In this context, the first and the second duration are determined in such a way that the ratio of the first duration to the sum of the first and the second duration equals the sum of the value 0.5 and the ratio of the product of the current strength flowing in the inductor and of a defined virtual resistance with regard to the amount of the input voltage. Advantageously, a virtual resistance is inserted into the two-quadrant chopper by this method, the virtual resistance effecting a dampening of the oscillating circuits formed in the two-quadrant chopper without the occurrence of a loss of power. Advantageously, this improves the controlling properties of the two-quadrant chopper.

The defined virtual resistance may amount to 1Ω (Ohm). Advantageously, a virtual resistance of 1Ω has proved to cause a sufficiently dampened behaviour of the two-quadrant chopper.

A control circuit for an electric drive comprises a two-quadrant chopper of the above-mentioned kind. In some preferred embodiments, only a low amount of losses occurs in this control circuit. Thus, the control circuit has a high efficiency.

The control circuit may comprise a rectifier provided to generate a first dc voltage from a mains voltage, whereby the first dc voltage may be applied to the two-quadrant chopper as an input voltage. Advantageously, the first dc voltage may be generated with a high voltage value by the rectifier and said high dc voltage may subsequently be transformed by the two-quadrant chopper into two output voltages having lower voltage values.

The rectifier may comprise a B6 diode bridge, and may also comprise a feed-in converter.

The control circuit may further comprise a converter provided to generate a three-phase voltage from a second dc voltage, wherein the first output voltage or the second output voltage of the two-quadrant chopper may be applied to the converter as a second dc voltage. Advantageously, the three-phase voltage generated by the converter may then serve to supply an electric drive. Advantageously, the converter may thereby be configured in a compact and inexpensive manner since the second dc voltage applied to the converter only has a low voltage value.

The converter may comprise a MOSFET transistor. Advantageously, the comparatively low voltage value of the second dc voltage allows for configuring the converter with MOSFET transistor which allow for a very high efficiency. Thus, the losses occurring in the converter are minimized which allows for the converter to be configured in a space-saving and inexpensive manner.

The converter may be integrated in a motor. Advantageously, the possibility of configuring the converter in a compact manner allows for integrating the converter in an motor, thus resulting in a compact design for the entire control circuit. Advantageously, cable capacitance also becomes redundant due to the integration of the converter in the motor.

Embodiments, including preferred embodiments, have been presented in this application for the purpose of illustration and description. They are not intended to be exhaustive or to limit the invention to the precise components, forms and steps disclosed. The embodiments were chosen and described to illustrate the principles of the invention and the practical application thereof, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A two-quadrant chopper comprising:
a first node, a second node, a third node and a fourth node, wherein an input voltage may be applied between the first node and the second node, a first output voltage may be picked off between the first node and the third node, and a second output voltage may be picked off between the third node and the second node;
a first capacitor between the first node and the third node and a second capacitor between the third node and the second node;
a collector of a first transistor connected to the first node and an emitter of the first transistor connected to the fourth node;
a cathode of a first diode connected to the first node and an anode of the first diode connected to the fourth node;
a collector of a second transistor connected to the fourth node and an emitter of the second transistor connected to the second node;
a cathode of a second diode connected to the fourth node and an anode of the second diode connected to the second node; and
an inductor between the third node and the fourth node;
the two-quadrant chopper further comprising a device for measuring an electric current flowing in the inductor, and
a unit configured to mutually switch the first transistor and the second transistor between a conducting state and a non-conducting state according to a modulation index, wherein the modulation index is a sum of a value 0.5 and a ratio of a product of a current strength flowing in the inductor and of a defined virtual resistance with regard to an amount of the input voltage.

2. The two-quadrant chopper of claim 1, wherein at least one of the first transistor and the second transistor are bipolar transistors comprising an insulated gate electrode.

3. The two-quadrant chopper of claim 1, further comprising an auxiliary winding which, together with the inductor, forms a transformer.

4. The two-quadrant chopper of claim 3, further comprising a rectifier and a further capacitor, the further capacitor connected to the auxiliary winding via the rectifier.

5. The two-quadrant chopper of claim 1, further comprising an electrical resistance between the third node and the fourth node in a series-connection with the inductor.

6. The two-quadrant chopper of claim 1, further comprising a device for measuring an electric current flowing in the inductor.

7. The two-quadrant chopper of claim 6, further comprising a unit configured to change a modulation index according to a strength of current flowing in the inductor.

8. A method for operating a two-quadrant chopper comprising
a first node, a second node, a third node and a fourth node, wherein an input voltage is applied between the first node and the second node, a first output voltage is picked off between the first node and the third node and a second output voltage is picked off between the third node and the second node,
a first capacitor between the first node and the third node and a second capacitor between the third node and the second node,
a collector of a first transistor connected to the first node and an emitter of the first transistor connected to the fourth node,
a cathode of a first diode connected to the first node and an anode of the first diode connected to the fourth node,
a collector of a second transistor connected to the fourth node and an emitter of the second transistor connected to the second node,
a cathode of a second diode connected to the fourth node and an anode of the second diode connected to the second node, and
an inductor between the third node and the fourth node,
wherein the two-quadrant chopper further comprises a device for measuring an electric current flowing in the inductor, the method comprising the steps of:
in a first time interval having a first duration, operating the first transistor in a conducting state and operating the second transistor in a non-conducting state;
in a second time interval having a second duration, operating the first transistor in a non-conducting state and operating the second transistor in a conducting state;
wherein the first time interval follows upon the second time interval, and
wherein the first and the second duration are chosen in such a way that a ratio of the first duration with regard to a sum of the first and second durations equals a sum of a value 0.5 and a ratio of a product of a current strength flowing in the inductor and of a defined virtual resistance with regard to an amount of the input voltage.

9. The method according to claim 8, wherein the first duration equals the second duration.

10. A control circuit for an electric drive comprising
a two-quadrant chopper, the two-quadrant chopper comprising a first node, a second node, a third node and a fourth node,
wherein an input voltage may be applied between the first node and the second node, a first output voltage may be picked off between the first node and the third node, and a second output voltage may be picked off between the third node and the second node,
a first capacitor between the first node and the third node and a second capacitor between the third node and the second node,
a collector of a first transistor connected to the first node and an emitter of the first transistor connected to the fourth node,
a cathode of a first diode connected to the first node and an anode of the first diode connected to the fourth node,
a collector of a second transistor connected to the fourth node and an emitter of the second transistor connected to the second node,
a cathode of a second diode connected to the fourth node and an anode of the second diode connected to the second node, and
an inductor between the third node and the fourth node,
the two-quadrant chopper further comprising a device for measuring an electric current flowing in the inductor, and
a unit configured to mutually switch the first transistor and the second transistor between a conducting state and a non-conducting state according to a modulation index, wherein the modulation index is a sum of a value 0.5 and a ratio of a product of a current strength flowing in the inductor and of a defined virtual resistance with regard to an amount of the input voltage.

11. The control circuit of claim 10, further comprising a rectifier configured to generate a first DC voltage from a mains voltage, wherein the first DC voltage may be applied to the two-quadrant chopper as an input voltage.

12. The control circuit of claim 10, further comprising a converter configured to generate a three-phase voltage from a second DC voltage, wherein the first output voltage or the second output voltage of the two-quadrant chopper may be applied to the converter as a second DC voltage.

13. The control circuit of claim 12, wherein the converter comprises a MOSFET.

14. The control circuit of claim 12, wherein the converter is integrated into a motor.

* * * * *